June 19, 1945.                R. LARAQUE                2,378,712
SHOCK ABSORBING MEANS FOR AIRCRAFT LANDING GEAR
Filed March 17, 1939                3 Sheets-Sheet 1
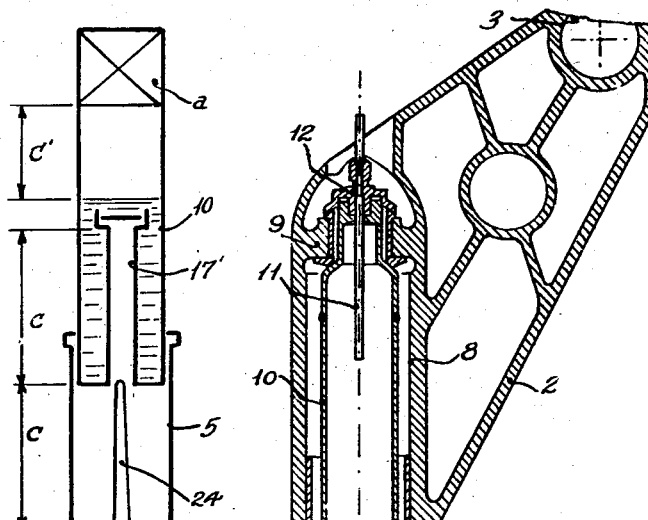
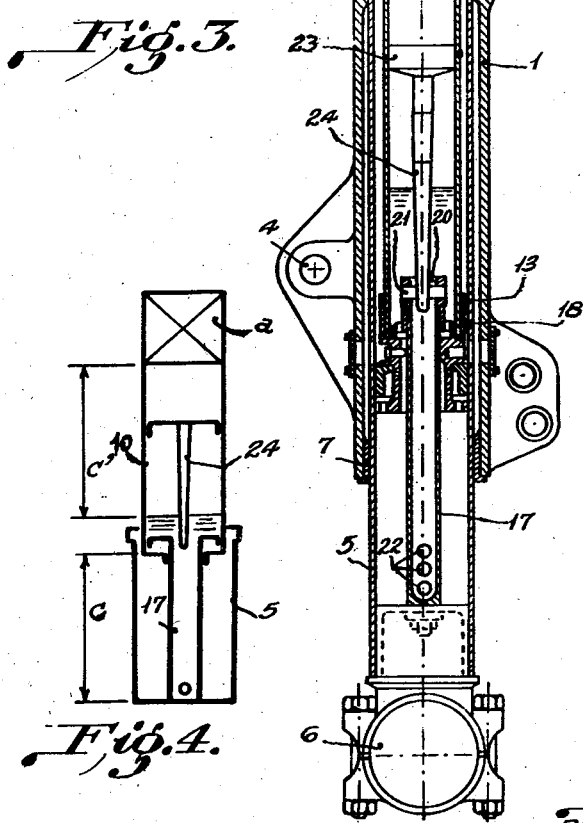
Inventor
ROLAND LARAQUE
By
Attorney.

Inventor
ROLAND LARAQUE
By
Attorney.

June 19, 1945.  R. LARAQUE  2,378,712
SHOCK ABSORBING MEANS FOR AIRCRAFT LANDING GEAR
Filed March 17, 1939   3 Sheets-Sheet 3

Inventor
ROLAND LARAQUE
By
Attorney.

Patented June 19, 1945

2,378,712

UNITED STATES PATENT OFFICE 2,378,712

SHOCK ABSORBING MEANS FOR AIRCRAFT LANDING GEAR

Roland Laraque, Paris, France; vested in the Alien Property Custodian

Application March 17, 1939, Serial No. 262,509 In Luxemburg March 18, 1938

3 Claims. (Cl. 267—64)

The constant increase in weight and load on aircraft renders the problem of landing more and more difficult. It is obvious that independently of the static charge which it has to resist, the landing gear must support forces and stresses presenting multiple components. But to these various forces must be added a vis viva or inertia force which becomes greater with increase of the weight and speed of the aircraft It is therefore necessary to give not only to all the elements of the landing gear a resistance proportionate to the said forces but also to devise a shock absorber system for the landing gear which corresponds to the static charge and said important vis viva.

By reason of the order of the forces set up it is no longer possible to utilise mechanical shock absorbers with springs or "sandows" or even air actuated shock absorbers which are found to be insufficient. Thus aircraft constructors have in a general way adopted shock absorbers braked by liquid and commonly known as hydro- or oleopneumatic absorbers.

However, the presently existing shock absorber arrangements have the inconvenience of presenting either an insufficient stroke or a cumbersomeness necessitating an abnormal elevation of the fuselage above the ground and difficulties in retracting the landing gear.

The present invention, therefore, has for an object an oleo-pneumatic shock absorbing device for landing gear adapted to resist all the forces above referred to and designed to absorb the inertia force of the said device in such a manner that the absorption of work resulting from this shock absorption, can occur, on the one hand, independently of the speed of the latter by:

First: the wheel tires being suitated at the extremity of the gear legs;

Second: the compression of the air in the shock absorbers in relation to the speed of said shock absorption, Third: the slicing off of the liquid passing through a variable section created in each shock absorber between an upper cylinder integral with the landing gear and a lower cylinder integral with the wheel bearing and sliding alongside of the first cylinder which encases it, this section being adjusted in such a manner that the slicing shall be very considerable at landing and very slight in travel.

Second and third conditions are fully realized by the shock absorbing device provided according to the invention and which more particularly has the following characteristics:

One of said characteristics resides in the means used to obtain a variation of the section for the passage of liquid, according to the course, such that it permits of obtaining on landing a given shock absorbing graph preferably of trapezoidal course and, consequently, a progression of the load transmitted to the supporting planer.

Another feature resides in that the above devised variation in section of the passage of liquid is obtained by means of a needle valve of known type the section of which can be easily adaptable to any characteristic graph desired and which due to its position on the upper cylinder in the shock absorber permits, for an equal stroke, a much less amount of space occupied than that by shock absorbers of the presently existing type.

Another feature of the invention resides in a plunging tube serving to establish the level of liquid at the filling operation, provided in the upper cylinder and which allows, owing to its easy dismantling and its interchangeability, to modify the ratio of air compression on which the smoothness of running depends.

A further feature resides in the complete filling with liquid in the forward travel, of a novel return pump, consisting of an air cylinder and its lower end on the one hand, and a piston with valve integral with the lower cylinder, on the other hand, and connecting the return to the discharge of liquid in the lower cylinder through an adjustable passage formed in the lower bottom of the air cylinder, this filling thus eliminating any vacuum in the pump which is a cause of hardness of the shock absorber at the forward movement and of a rapid return (rebound).

An additional feature resides in the arrangement of a regulating member of the section for the passage of said liquid which permits of the easy access of said organ from the outside at any moment and in any place without necessitating any dismantling, the delivery of return liquid from the upper cylinder to the lower cylinder being thus easily brought to a value such that any rebound is suppressed and this facility of adjustment rendering it always possible to adapt the characteristics of the shock absorber to those of aircraft type under consideration.

Still another feature resides in that the communication between the lower cylinder and the air cylinder, with reference to the return speed, in all positions is important, ensuring in this way the complete return to the lower cylinder of the small complement of oil not delivered by the return pump and eliminating in this manner in this cylinder any vacuum which would be a cause of shock at the next following forward stroke.

Various other particularities will be evident from the following description together with the accompanying drawings in which:

Fig. 1 shows one of the limbs of the landing gear in longitudinal section;

Figs. 3 and 4 are comparative diagrams of the space occupied by the shock absorber constructed according to the invention and that of an existing shock absorber;

Figures 2, 6:
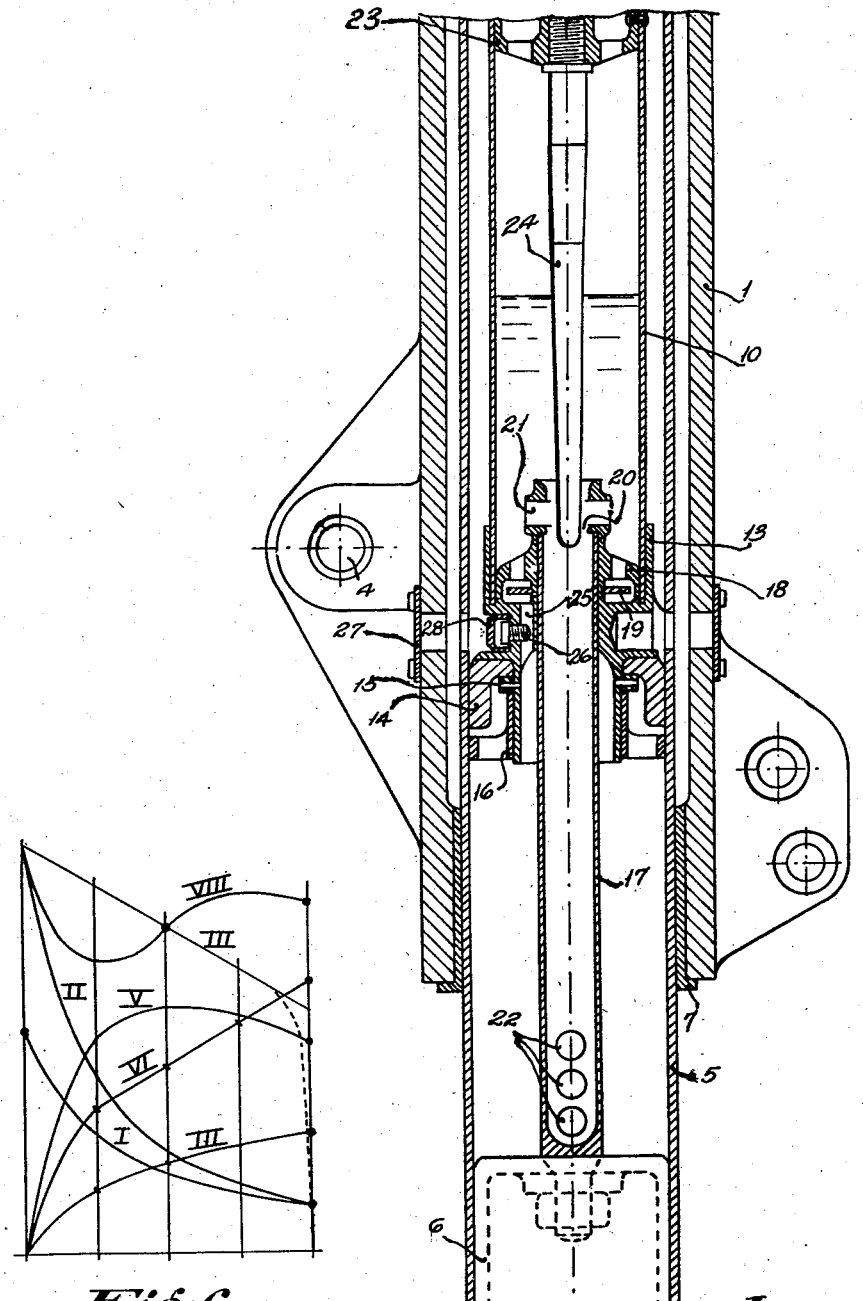
Fig. 2 is a section (drawn to a larger scale) of the main part of a shock absorber embodying the invention.
Fig. 6 illustrates the diagram or graph of said shock absorber.

In one form of embodiment of the invention, the shock absorber is partly housed in casings 1, 1' (Fig. 1) provided in form of a fork in each of the limbs of the landing set.

The landing set is articulated by means of bearings 3 on the driving spindle (not shown) and receives in a bearing 4 the shaft of the wind bracing (not shown).

Each shock absorber comprises a lower cylinder 5 terminated at its base, in a bearing 6 for the wheel axle (not shown) and sliding in a lower bearing 7 and in an upper bearing 8 disposed in the casing 1.

At the end of the forward stroke the wheel bearing 6 abuts at the end of the casing against the lower bearing 7.

On the upper end 9 of the casing 1, there is mounted with a ball joint a cylinder 10 engaging in the previously mentioned lower cylinder 5.

The upper end 9 is traversed by a depending level indicating tube 11, accessible and dismantleable from the outside of the casing 1 by means of a screw plug 12 which carries it.

At its other extremity the cylinder 10 (Figs. 1 and 2) is provided with a lower bottom 13, which can be dismantled and is provided with a tight sleeve 14 tightened onto it by a washer 15 and a nut 16 of a shape such that it forms a means for guiding the upper cylinder 10 in the lower cylinder 5.

The lower bottom 13 is traversed by a hollow tubular member 17 secured at one of its extremities on the wheel bearing 6 and carrying at its other extremity a fixed piston 18 with movable valve plate 19 therein, said piston and said member 17 being movable in cylinder 10.

The piston 18 is provided with openings 20 and 21 adapted to allow the passage of the liquid L contained in the two cylinders 5 and 10. The member or brace 17 has adjacent its base openings 22 formed for the passage of liquid. All these openings must be sufficiently large for passage of liquid from one cylinder to the other.

At the inside of the cylinder 10 there is secured a mandrel 23 carrying a needle valve 24 of variable diameter along its length and readily interchangeable. The play between the section of this needle and the bore or passageway 20 of the movable piston 18 determines the section of variable passage according to the stroke of said piston.

A small channel 25 is bored in the end portion 13 and more or less obturated at will by a plug 26 accessible from the outside of the casing 1 through a door 27 and after unscrewing a tight cover 28.

It will immediately be seen that such a device has a very great advantage over oleo-pneumatic apparatus heretofore known and which offers a much less resistance for an equivalent stroke.

If one considers, in fact, a shock absorber of known type (Fig. 3) comprising a needle 24 integral with the lower cylinder 5 a flue 17' must be provided at least of the same length as the stroke of said cylinder 5 and as the level of the liquid in the upper cylinder 10 must at no time descend below the valve situated at the upper part of the flue, it will be seen that, the dead space a being always present, the total length of the absorber must include a first space c' corresponding to the cylinder space and twice the stroke c.

The shock absorber according to the invention comprises, as is seen in Fig. 4, only once the stroke instead of twice and gives, for this reason, a gain in total height of the absorber, all other conditions being equal.

The operation of the shock absorber is as follows:

At the moment of landing the cylinder 5 plunges into the casing 1 and the piston 18 slides inside the cylinder 10; during this forward stroke, the valve plate 19 moves in a direction opposite to that of the piston movement and offers a large section for the passage of liquid, allowing under the pressure of air contained in cylinder 10 above the level of its liquid, the complete filling of the pump for the return, as only liquid it contained between the lower end 13 of the cylinder 10 and the piston 18.

It will thus be seen that during the forward stroke, no vacuum, which would be a cause of a rapid return and a rebound over all or part of the return stroke, can occur. In fact, at the start of the return stroke the valve plate 19 moves in a direction to close automatically the passages in said piston positioned directly in front of said plate and the imprisoned liquid (between said piston 18 and bottom 13) is then no longer discharged for the major part into the lower cylinder 5 except through the aforesaid passage 25 adjustable by screw plug 26, whereas the space between piston 18 and needle 24 offers through cross member or brace 17 a large return passage to then ensure the complete filling of the lower cylinder 5.

The return of the movable parts takes place, therefore, slowly and it is thus impossible, that a vacuum can be created, constituting otherwise a cause of shock in the consecutive forward stroke, to be produced in the lower cylinder 5.

The speed of this return can be easily modified at any place and at any moment without any dismantling by simply acting on the plug 26 after having placed the fork on a jack and brought the shock absorber to abut against the return abutment (position of Figs. 1 and 2).

This adjustment permits by the above simple movement the adaptation of the features of the shock absorber to all types of aircraft.

The ratio of compression can likewise be adjusted very easily by modifying the length of the plunger tube 11 directly dismantleable with the plug 12 which is accessible from the outside.

On the length of the tube 11 depends in fact the quantity of liquid introduced in the cylinders and from its selection, there results therefore a more or less smooth running.

Figure 5:
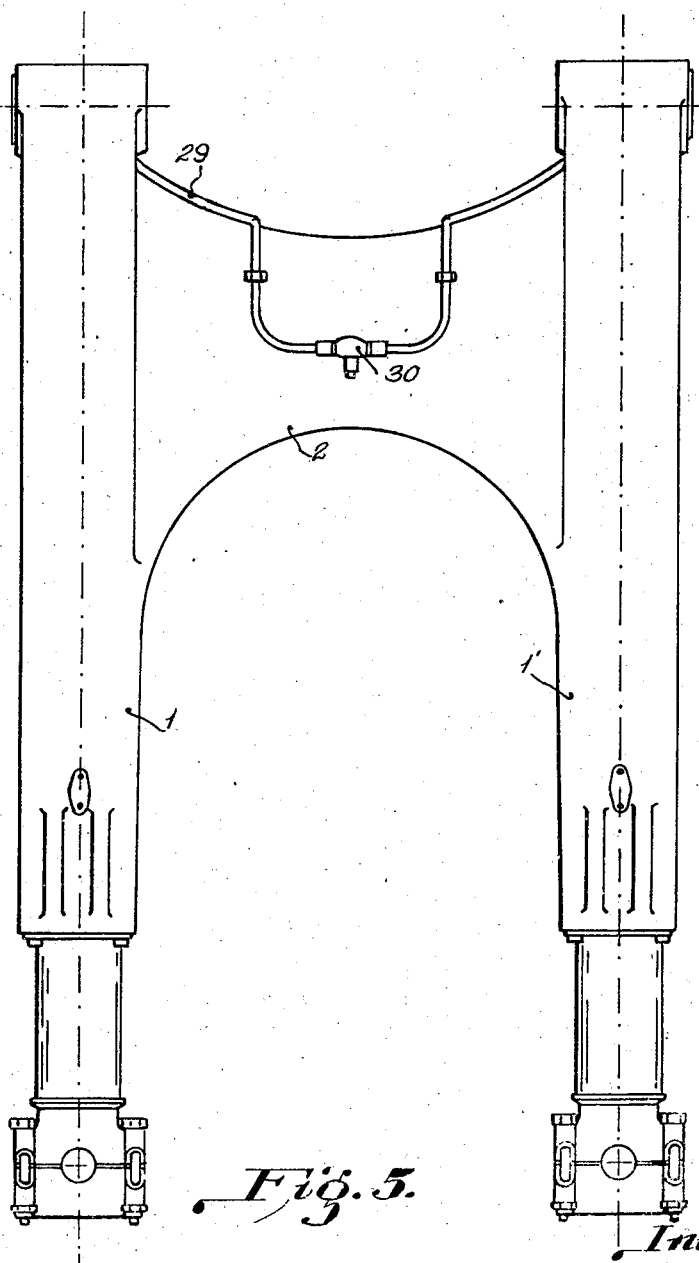
Fig. 5 shows the landing gear in plan view.

In order to ensure that the ratio of compression shall be identical in the shock absorbers of both limbs 1 and 1' (Fig. 5) of the half carriage, the plunger tubes 11 of the two absorbers are interconnected by piping 29 passing through a device 30 which permits of the filling and inflation of the shock absorbers.

The variation of the section for the passage of liquid by the openings 20 and 21 can be modified at will by the adoption of a needle 24 of appropriate shape and which, while being removable, can be replaced by any other needle adapted to the characteristics desired.

This variation in section of the passage for the liquid according to the stroke permits of obtaining, for example, on landing, a trapezoidal shock absorbing diagram and thereby a progressiveness of the load transmitted to the wing surface. This diagram is represented at Fig. 6 and shows the advantage of the device of the invention over absorbers with constant section.

On this diagram the curve I relates to the variation of the load according to the isotherm, for a slow compression and for the case of running on the ground, the static equilibrium of the load being at half stroke.

The curve II corresponds to the compression of the air according to the adiabatic at the moment of landing.

The curve III (casing: air+liquid) determines the total surface of the diagram of work to be absorbed by the shock absorber in terms of the height of fall at landing.

Curve IV corresponds to the variation of the speed of shock absorption, deduced from the curve III. The surface comprised between the curves II and III delimits the slicing work of the liquid, transformed into heat.

Curve V represents the over-pressure in kg./cm.$^2$ in the lower cylinder 5 with regard to the air cylinder 10, deduced from the difference, at all points, between the curves III and II.

Curve VI represents the section of passage of the liquid, corresponding to the curve III (total absorbed work) through the medium of curves V, IV and II.

VIII represents the graph of a shock absorbing for a hydro-pneumatic absorber comprising hydraulic braking by slicing or lamination of the liquid through a constant section. The surfaces deliminated by the curves III and VIII are identical.

It is obvious that modifications in shape and detail can be embodied in the shock absorber described hereinbefore by way of example in no way limitative and that without exceeding the scope of the invention.

What I claim is:

1. A shock absorber for aircraft landing gear and provided with hydraulic means, comprising a wheel bearing, an upper cylinder connected to said landing gear and being provided at one end thereof with a bottom piece including a channel, a lower cylinder connected to said bearing, a tubular member provided with an opening adjacent one end thereof and extending substantially from said bearing lengthwise thereof within said lower cylinder, a hollow piston including a valve plate movable therein and a plurality of passageways, a substantially conically-shaped pin fixed to and projecting from within said upper cylinder into one of said passageways of said piston, said piston being fixed to the other end of said tubular member and being slidable within said upper cylinder, whereby during one stroke of said piston sliding in said upper cylinder said valve plate and said pin regulate flow of said hydraulic means through said passageways behind said piston, whereas during another stroke of said piston said valve plate closes adjacent passageways allowing flow of said hydraulic means through said bottom channel into said lower cylinder and then through said opening of said tubular member back into said upper cylinder.

2. A shock absorber for aircraft landing gear and provided with hydraulic means comprising a wheel bearing, an upper cylinder connected to said landing gear and being provided at one end thereof with a bottom piece including a channel, a level indicating tube extending within said upper cylinder from therewithout and being removably attached to the other end of said upper cylinder, a lower cylinder connected to said bearing, a tubular member provided with an opening adjacent one end thereof, said member extending substantially from said bearing lengthwise within said lower cylinder, a hollow piston including a valve plate movable therein and a plurality of passageways, a substantially conically-shaped pin fixed to and projecting from within said upper cylinder into one of said passageways of said piston, said piston being joined to the other end of said tubular member and being slidable in said upper cylinder, whereby during one stroke of said upper cylinder said valve plate and said pin regulate flow of said hydraulic means through said passageways behind said piston, whereas during another stroke of said piston said valve plate moves to adjacent passageways of said piston to close the same allowing flow of said hydraulic means from behind said piston through said bottom channel into said lower cylinder and then through said opening of said tubular member back to said upper cylinder past said pin.

3. A shock absorber for aircraft landing gear and provided with hydraulic means comprising a wheel bearing, an upper cylinder connected to said landing gear and carrying at one end thereof a bottom piece including an adjustable channel, a lower cylinder connected to said bearing, a tubular member provided with a plurality of openings at substantially one end thereof and extending from said bearing lengthwise within said lower cylinder and being joined thereto, a hollow piston including a movable valve plate and a plurality of passageways, said piston being disposed at the free end of said tubular member, one of said passageways being arranged in axial alinement with said tubular member and with at least one other passageway arranged transversely thereof, a substantially conically-shaped pin projecting from within said upper cylinder into said axial passageway and being joined to said upper cylinder, said pin and said passageways regulating change of flow of said hydraulic means according to the stroke of said piston, and a casing, said lower cylinder being slidable within said casing and relatively to said upper cylinder, whereby during one stroke of said piston said valve plate and said pin regulate flow of said hydraulic means through said passageways behind said piston, whereas during another stroke of said piston said valve plate moves to adjacent passageways of said piston to close the same allowing flow of said hydraulic means from behind said piston through said bottom channel into said lower cylinder and then through said opening of said tubular member back to said upper cylinder past said pin.

ROLAND LARAQUE.